United States Patent Office 3,422,016
Patented Jan. 14, 1969

3,422,016
ANTIOXIDANT MIXTURE OF BORON ESTER OF AN ALKANOLAMINE AND A HYDROXYPHENONE, AND USE THEREOF
Henryk A. Cyba, Evanston, Ill., assignor to Universal Oil Products Company, Des Plaines, Ill., a corporation of Delaware
No Drawing. Continuation-in-part of application Ser. No. 367,854, May 15, 1964. This application July 21, 1967, Ser. No. 654,961
The portion of the term of the patent subsequent to Jan. 31, 1984, has been disclaimed
U.S. Cl. 252—49.6     19 Claims
Int. Cl. B01j 1/16

ABSTRACT OF THE DISCLOSURE

Synergistic antioxidant mixture of borate of N,N-dihydrocarbyl-alkanolamine or borate of polyalkyl- or polycycloalkyl - polyhydroxyalkyl-alkylenepolyamine and a hydroxyphenone, with or without small amount of trialkylphenol. This antioxidant mixture is used as an additive in organic substrates normally subject to oxidative deterioration.

CROSS-REFERENCE TO RELATED APPLICATIONS

This is a continuation-in-part of application Ser. No. 367,854, filed May 15, 1964, now Patent No. 3,382,208 dated May 7, 1968, and of application Ser. No. 559,410, filed June 22, 1966, the latter application being a division of application Ser. No. 366,921, filed May 12, 1964, and now Patent No. 3,301,888, dated Jan. 31, 1967.

The parent applications referred to above are directed primarily to the improvement of the weathering properties of a solid substrate and particularly a plastic. Plastic and other solid polymeric substrates are exposed to ultraviolet light and undergo deterioration from this source, as well as from oxidation reactions induced by such weathering. As set forth in the parent applications, borates of the N,N-dihydrocarbyl-alkanolamines and the polyalkypolyhydroxyalkylalkylenepolyamines are very effective in retarding such deterioration. These additives may be used in conjunction with other additives.

DESCRIPTION OF THE PRESENT INVENTION

The present invention is based on the discovery that a mixture of a borate of N,N-dihydrocarbyl-alkanolamine or of the borate of the polyalkyl- or polycycloalkylpolyhydroxyalkyl-alkylenepolyamine and a hydroxyphenone produces a synergistic mixture of outstanding antioxidant properties. This synergistic mixture accordingly is of advantage for use in any organic substrate which undergoes deterioration due to oxidation reactions.

In one embodiment the present invention relates to a synergistic antioxidant mixture of a borate of N,N-dihydrocarbylalkanolamine and a hydroxyphenone.

In another embodiment the present invention relates to a synergistic antioxidant mixture of a borate of a polyalkylpolyhydroxyalkyl-alkylenepolyamine and a hydroxyphenone.

In still another embodiment the present invention comprises a synergistic mixture as described above also containing a minor concentration of a trialkylphenol.

In a specific embodiment the present invention comprises a synergistic antioxidant mixture of about 10% to about 90% by weight of a borate of N,N-dihydrocarbylalkanolamine and about 10% to about 90% by weight of a hydroxyphenone, with or without about 0.1% to about 10% by weight of said mixture of a trialkylphenol.

In another specific embodiment the present invention comprises a synergistic antioxidant mixture of about 10% to about 90% by weight of a borate of N,N'-di-sec-alkyl-N,N'-dihydroxyalkylethylenediamine and about 10% to about 90% by weight of a hydroxyphenone, with or without about 0.1% to about 10% by weight of said mixture of a trialkylphenol.

In another embodiment, the present invention relates to a method of stabilizing an organic substrate normally subject to oxidative deterioration by incorporating therein a stabilizing concentration of a synergistic mixture as herein defined.

The borate comprising a component of the synergistic mixture may be illustrated as a borate of an alkanolamine of the following formula:

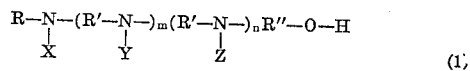

where R is hydrocarbyl, R' is alkylene, R" is alkylene, X is hydrocarbyl when $m$ and $n$ are zero or hydroxyalkyl when $m$ is one or more and/or $n$ is one, Y is hydrocarbyl when $m$ is one and $n$ is zero or hydroxyalkyl when $m$ is more than one and $n$ is one, Z is hydrocarbyl, $m$ is an integer of zero to 4 and $n$ is zero or one.

Where $m$ and $n$ are zero and X is hydrocarbyl, this component of the mixture is a borate of an N,N-dihydrocarbylalkanolamine. In one embodiment the hydrocarbyl is alkyl and preferably sec-alkyl containing from 3 to about 20 carbon atoms although, when desired, each alkyl group may contain up to 50 carbon atoms. Illustrative preferred alkanolamines in this embodiment include N,N-di-isopropyl-ethanolamine,
N,N di-sec-butyl-ethanolamine,
N,N-di-sec-pentyl-ethanolamine,
N,N-di-sec-hexyl-ethanolamine,
N,N-di-sec-heptyl-ethanolamine,
N,N-di-sec-octyl-ethanolamine,
N,N-di-sec-nonyl-ethanolamine,
N,N-di-sec-decyl-ethanolamine,
N,N-di-sec-undecyl-ethanolamine,
N,N-di-sec-dodecyl-ethanolamine,
N,N-di-sec-tridecyl-ethanolamine,
N,N-di-sec-tetradecyl-ethanolamine,
N,N-di-sec-pentadecyl-ethanolamine,
N,N-di-sec-hexadecyl-ethanolamine,
N,N-di-sec-heptadecyl-ethanolamine,
N,N-di-sec-octadecyl-ethanolamine,
N,N-di-sec-nonadecyl-ethanolamine,
N,N-di-sec-eicosyl-ethanolamine, etc., and corresponding compounds in which the ethanolamine moiety is replaced by propanolamine or butanolamine and, when desired, by pentanolamine, hexanolamine, heptanolamine, octanolamine, etc. In general, it is preferred that the alkyl groups are the same. However, when desired, the alkyl groups may be different but both of them preferably are of secondary configuration.

In another embodiment, the borate of the N,N-dihydrocarbylalkanolamine is a borate of N,N-dicycloalkyl-alkanolamine. A particularly preferred alkanolamine in this embodiment is N,N - dicyclohexyl - ethanolamine. Other compounds include N,N-dicyclopropyl-ethanolamine,
N,N-dicyclobutyl-ethanolamine,
N,N-dicyclopentyl-ethanolamine,
N,N-dicycloheptyl-ethanolamine,
N,N-dicyclooctyl-ethanolamine,
N,N-dicyclononyl-ethanolamine,
N,N-dicyclodecyl-ethanolamine,
N,N-dicycloundecyl-ethanolamine,
N,N-dicyclododecyl-ethanolamine, etc., and similarly substituted compounds in which the ethanolamine moiety is replaced by an alkanolamine group containing from 3 to about 8 carbon atoms.

In another embodiment the N,N - dihydrocarbyl-alkanolamine may contain one sec-alkyl group and one cycloalkyl group as, for example, in compounds as N-isopropyl-N-cyclohexyl-ethanolamine,
N-sec-butyl-N-cyclohexyl-ethanolamine,
N-sec-pentyl-N-cyclohexyl-ethanolamine,
N-sec-hexyl-N-cyclohexyl-ethanolamine,
N-sec-heptyl-N-cyclohexyl-ethanolamine,
N-sec-octyl-N-cyclohexyl-ethanolamine, etc., and corresponding compounds in which the ethanolamine moiety is replaced by an alkanolamine moiety of from 3 to about 8 carbon atoms.

The N,N,-dihydrocarbyl-alkanolamine for use in the present invention may be obtained from any suitable source or may be prepared in any suitable manner. Details of the preparation of these compounds are set forth in the parent application and are embodied herein as part of the present specifications.

Where $n$ and/or $m$ in the above formula are one or more, this component of the mixture is a borate of a particular polyalkyl- or polycycloalkyl polyhydroxyalkyl-alkylenepolyamine which also may be named as an alkanolamine. In this embodiment X is hydroxyalkyl, Y is hydrocarbyl when $n$ is zero or hydroxyalkyl when $n$ is one, and Z is hydrocarbyl.

Referring to the above formula, where $m$ is zero and $n$ is one, the compound is an N,N'-dialkyl-N-hydroxyalkyl - aminoalkyl - alkanolamine, which also may be named N,N' - dialkyl-N,N' - dihydroxyalkyl - ethylenediamine. The alkyl groups preferably are secondary alkyl groups and contain from 4 to about 50 carbon atoms each and more particularly from 4 to 20 carbon atoms each. Illustrative preferred compounds in this embodiment include N,N-di-sec-butyl-N-hydroxyethyl-aminoethyl-ethanolamine,
N,N'-di-sec-pentyl-N-hydroxyethyl-aminoethyl-ethanolamine,
N,N'-di-sec-hexyl-N-hydroxyethyl-aminoethyl-ethanolamine,
N,N'-di-sec-heptyl-N-hydroxyethyl-aminoethyl-ethanolamine,
N,N'-di-sec-octyl-N-hydroxyethyl-aminoethyl-ethanolamine,
N,N'-di-sec-nonyl-N-hydroxyethyl-aminoethyl-ethanolamine,
N,N'-di-sec-decyl-N-hydroxyethyl-aminoethyl-ethanolamine,
N,N'-di-sec-undecyl-N-hydroxyethyl-aminoethyl-ethanolamine,
N,N'-di-sec-dodecyl-N-hydroxyethyl-aminoethyl-ethanolamine,
N,N'-di-sec-tridecyl-N-hydroxyethyl-aminoethyl-ethanolamine,
N,N'-di-sec-tetradecyl-N-hydroxyethyl-aminoethyl-ethanolamine,
N,N'-di-sec-pentadecyl-N-hydroxyethyl-aminoethyl-ethanolamine,
N,N'-di-sec-hexadecyl-N-hydroxyethyl-aminoethyl-ethanolamine,
N,N'-di-sec-heptadecyl-N-hydroxyethyl-aminoethyl-ethanolamine,
N,N'-di-sec-octadecyl-N-hydroxyethyl-aminoethyl-ethanolamine,
N,N'-di-sec-nonadecyl-N-hydroxyethyl-aminoethyl-ethanolamine,
N,N'-di-sec-eicosyl-N-hydroxyethyl-aminoethyl-ethanolamine, etc.

The above compounds are illustrative of compounds in which R' and R" each contain two carbon atoms. It is understood that corresponding compounds are included in which one or both of the groups containing two carbon atoms are replaced by a group containing 3, 4, 5 or 6 carbon atoms.

Referring again to the above formula, where $m$ and $n$ are one, the compounds for use in preparing the borate named N,N-bis-[N-alkyl-N-(hydroxyalkyl)-aminoalkyl]-alkanolamine which also can be named $N^1,N^3$-dialkyl-$N^1,N^2,N^3$ - tri - (hydroxyalkyl)-diethylenetriamine. It will be noted that each terminal nitrogen contains an alkyl group and each nitrogen atom contains a hydroxyalkyl group attached thereto. Illustrative preferred compounds in this embodiment include N,N-bis-[N-sec-butyl-N-(2-hydroxyethyl)-aminoethyl]-ethanolamine,
N,N-bis-[N-sec-pentyl-N-(2-hydroxyethyl)-aminoethyl]-ethanolamine,
N,N-bis-[N-sec-hexyl-N-(2-hydroxethyl)-aminoethyl]-ethanolamine,
N,N-bis-[N-sec-heptyl-N-(2-hydroxyethyl)-aminoethyl]-ethanolamine,
N,N-bis[N-sec-octyl-N-(2-hydroxyethyl)-aminoethyl]-ethanolamine,
N,N-bis-[N-sec-nonyl-N-(2-hydroxyethyl)-aminoethyl]-ethanolamine,
N,N-bis-[N-sec-decyl-N-(2-hydroxyethyl)-aminoethyl]-ethanolamine,
N,N-bis-[N-sec-undecyl-N-(2-hydroxyethyl)-aminoethyl]-ethanolamine,
N,N-bis-[N-sec-dodecyl-N-(2-hydroxyethyl-aminoethyl]-ethanolamine,
N,N-bis-[N-sec-tridecyl-N-(2-hydroxyethyl)aminoethyl]-ethanolamine,
N,N-bis-[N-sec-tetradecyl-N-(2-hydroxyethyl)-aminoethyl]-ethanolamine,
N,N-bis-[N-sec-pentadecyl-N-(2-hydroxyethyl)-aminoethyl]-ethanolamine,
N,N-bis-[N-sec-hexadecyl-N-(2-hydroxyethyl)-aminoethyl]-ethanolamine,
N,N-bis-[N-sec-heptadecyl-N-(2-hydroxyethyl)-aminoethyl]-ethanolamine,
N,N-bis-[N-sec-octadecyl-N-(2-hydroxyethyl)-aminoethyl]-ethanolamine,
N,N-bis-[N-sec-nonadecyl-N-(2-hydroxyethyl)-aminoethyl]-ethanolamine,
N,N-bis-[N-sec-eicosyl-N-(2-hydroxyethyl)-aminoethyl]-ethanolamine, etc.

Here again, one or both of the groups containing two carbon atoms may be replaced by a group containing 3, 4, 5 or 6 carbon atoms.

Where $m$ is two and $n$ is one, the compound is an $N^1,N^4$ - dialkyl-$N^1,N^2,N^3,N^4$-tetrahydroxyalkyl-alkylenepolyamine. Illustrative compounds in this embodiment include $N^1,N^4$-di-sec-butyl-$N^1,N^2,N^3,N^4$-tetra-(2-hydroxyethyl)-triethylenetetramine,
$N^1,N^4$-di-sec-pentyl-$N^1,N^2,N^3,N^4$-tetra-(2-hydroxyethyl)-triethylenetetramine,
$N^1,N^4$-di-sec-hexyl-$N^1,N^2,N^3,N^4$-tetra-(2-hydroxyethyl)-triethylenetetramine,
$N^1,N^4$-di-sec-heptyl-$N^1,N^2,N^3,N^4$-tetra-(2-hydroxyethyl)-triethylenetetramine,
$N^1,N^4$-di-sec-octyl-$N^1,N^2,N^3,N^4$-tetra-(2-hydroxyethyl)-triethylenetetramine,
$N^1,N^4$-di-sec-nonyl-$N^1,N^2,N^3,N^4$-tetra-(2-hydroxyethyl)-triethylenetetramine,
$N^1,N^4$-di-sec-decyl-$N^1,N^2,N^3,N^4$-tetra-(2-hydroxyethyl)-triethylenetetramine,
$N^1,N^4$-di-sec-undecyl-$N^1,N^2,N^3,N^4$-tetra-(2-hydroxyethyl)-triethylenetetramine,
$N^1,N^4$-di-sec-dodecyl-$N^1,N^2,N^3,N^4$-tetra(2-hydroxyethyl)-triethylenetetramine,
$N^1,N^4$-di-sec-tridecyl-$N^1,N^2,N^3,N^4$-tetra-(2-hydroxyethyl)-triethylenetetramine, $N^1,N^4$-di-sec-tetradecyl-$N^1,N^2,N^3,N^4$-tetra-(2-hydroxyethyl)-triethylenetetramine,
$N^1,N^4$-di-sec-pentadecyl-$N^1,N^2,N^3,N^4$-tetra-(2-hydroxyethyl)-triethylenetetramine,
$N^1,N^4$-di-sec-hexadecyl-$N^1,N^2,N^3,N^4$-tetra-(2-hydroxyethyl)-triethylenetetramine,
$N^1,N^4$-di-sec-heptadecyl-$N^1,N^2,N^3,N^4$-tetra-(2-hydroxyethyl)-triethylenetetramine,
$N^1,N^4$-di-sec-octadecyl-$N^1,N^2,N^3,N^4$-tetra-(2-hydroxyethyl)-triethylenetetramine,
$N^1,N^4$-di-sec-nonadecyl-$N^1,N^2,N^3,N^4$-tetra-(2-hydroxyethyl)-$N^1,N^4$-di-sec-eicosyl-$N^1,N^2,N^3,N^4$-tetra-(2-hydroxyethyl)-triethylenetetramine, etc.

Here again, it is understood that one or both of the groups containing two carbon atoms may be replaced by a group containing 3, 4, 5 or 6 carbon atoms.

Referring again to the above formula, where $m$ is 3 and $n$ is 1, the compound will be $N^1,N^5$-dialkyl-$N^1,N^2,N^3,N^4,N^5$-penta-(hydroxyalkyl)-alkylenepolyamine. Illustrative preferred compounds in this embodiment include $N^1,N^5$-di-sec-butyl-$N^1,N^2,N^3,N^4,N^5$-penta-(2-hydroxyethyl)-tetraethylenepentamine,
$N^1,N^5$-di-sec-pentyl-$N^1,N^2,N^3,N^4,N^5$-penta-(2-hydroxyethyl)-tetraethylenepentamine,
$N^1,N^5$-di-sec-hexyl-$N^1,N^2,N^3,N^4,N^5$-penta-(2-hydroxyethyl)-tetraethylenepentamine,
$N^1,N^5$-di-sec-heptyl-$N^1,N^2,N^3,N^4,N^5$-penta-(2-hydroxyethyl)-tetraethylenepentamine,
$N^1,N^5$-di-sec-octyl-$N^1,N^2,N^3,N^4,N^5$-penta-(2-hydroxyethyl)-tetraethylenepentamine,
$N^1,N^5$-di-sec-nonyl-$N^1,N^2,N^3,N^4,N^5$-penta-(2-hydroxyethyl)-tetraethylenepentamine,
$N^1,N^5$-di-sec-decyl-$N^1,N^2,N^3,N^4,N^5$-penta-(2-hydroxyethyl)-tetraethylenepentamine,
$N^1,N^5$-di-sec-undecyl-$N^1,N^2,N^3,N^4,N^5$-penta-(2-hydroxyethyl)-tetraethylenepentamine,
$N^1,N^5$-di-sec-dodecyl-$N^1,N^2,N^3,N^4,N^5$-penta-(2-hydroxyethyl)-tetraethylenepentamine,
$N^1,N^5$-di-sec-tridecyl-$N^1,N^2,N^3,N^4,N^5$-penta-(2-hydroxyethyl)-tetraethylenepentamine,
$N^1,N^5$-di-sec-tetradecyl-$N^1,N^2,N^3,N^4,N^5$-penta-(2-hydroxyethyl)-tetraethylenepentamine,
$N^1,N^5$-di-sec-pentadecyl-$N^1,N^2,N^3,N^4,N^5$-penta-(2-hydroxyethyl)-tetraethylenepentamine,
$N^1,N^5$-di-sec-hexadecyl-$N^1,N^2,N^3,N^4,N^5$-penta-(2-hydroxyethyl)-tetraethylenepentamine,
$N^1,N^5$-di-sec-heptadecyl-$N^1,N^2,N^3,N^4,N^5$-penta-(2-hydroxyethyl)-tetraethylenepentamine,
$N^1,N^5$-di-sec-octadecyl-$N^1,N^2,N^3,N^4,N^5$-penta-(2-hydroxyethyl)-tetraethylenepentamine,
$N^1,N^5$-di-sec-nonadecyl-$N^1,N^2,N^3,N^4,N^5$-penta-(2-hydroxyethyl)-tetraethylenepentamine,
$N^1,N^5$-di-sec-eicosyl-$N^1,N^2,N^3,N^4,N^5$-penta-(2-hydroxyethyl)-tetraethylenepentamine, etc.

Here again, it is understood that one or both of the groups containing two carbon atoms may be replaced by a group containing 3, 4, 5 or 6 carbon atoms.

Referring again to the above formula, where $m$ is 4 and $n$ is 1, the compound will be $N^1,N^6$-dialkyl-$N^1,N^2,N^3,N^4,N^5,N^6$-hexa-(hydroxyalkyl)-pentaethylenehexamine. Illustrative preferred compounds in this embodiment include $N^1,N^6$-di-sec-butyl-$N^1,N^2,N^3,N^4,N^5,N^6$-hexa-(2-hydroxyethyl)-pentaethylenehexamine,
$N^1,N^6$-di-sec-pentyl-$N^1,N^2,N^3,N^4,N^5,N^6$-hexa-(2-hydroxyethyl)-pentaethylenehexamine,
$N^1,N^6$-di-sec-hexyl-$N^1,N^2,N^3,N^4,N^5,N^6$-hexa-(2-hydroxyethyl)-pentaethylenehexamine,
$N^1,N^6$-di-sec-heptyl-$N^1,N^2,N^3,N^4,N^5,N^6$-hexa-(2-hydroxyethyl)-pentaethylenehexamine,
$N^1,N^6$-di-sec-octyl-$N^1,N^2,N^3,N^4,N^5,N^6$-hexa-(2-hydroxyethyl)-pentaethylenehexamine,
$N^1,N^6$-di-sec-nonyl-$N^1,N^2,N^3,N^4,N^5,N^6$-hexa-(2-hydroxyethyl)-pentaethylenehexamine,
$N^1,N^6$-di-sec-decyl-$N^1,N^2,N^3,N^4,N^5,N^6$-hexa-(2-hydroxyethyl)-pentaethylenehexamine,
$N^1,N^6$-di-sec-undecyl-$N^1,N^2,N^3,N^4,N^5,N^6$-hexa-(2-hydroxyethyl)-pentaethylenehexamine,
$N^1,N^6$-di-sec-dodecyl-$N^1,N^2,N^3,N^4,N^5,N^6$-hexa-(2-hydroxyethyl)-pentaethylenehexamine,
$N^1,N^6$-di-sec-tridecyl-$N^1,N^2,N^3,N^4,N^5,N^6$-hexa-(2-hydroxy)-pentaethylenehexamine,
$N^1,N^6$-di-sec-tetradecyl-$N^1,N^2,N^3,N^4,N^5,N^6$-hexa-(2-hydroxyethyl)-pentaethylenehexamine,
$N^1,N^6$-di-sec-pentadecyl-$N^1,N^2,N^3,N^4,N^5,N^6$-hexa-(2-hydroxyethyl)-pentaethylenehexamine,
$N^1,N^6$-di-sec-hexadecyl-$N^1,N^2,N^3,N^4,N^5,N^6$-hexa-(2-hydroxyethyl)-pentaethylenehexamine,
$N^1,N^6$-di-sec-heptadecyl-$N^1,N^2,N^3,N^4,N^5,N^6$-hexa-(2-hydroxyethyl)-pentaethylenehexamine,
$N^1,N^6$-di-sec-octadecyl-$N^1,N^2,N^3,N^4,N^5,N^6$-hexa-(2-hydroxyethyl)-pentaethylenehexamine,
$N^1,N^6$-di-sec-nonadecyl-$N^1,N^2,N^3,N^4,N^5,N^6$-hexa-(2-hydroxyethyl)-pentaethylenehexamine,
$N^1,N^6$-di-sec-eicosyl-$N^1,N^2,N^3,N^4,N^5,N^6$-hexa-(2-hydroxyethyl)-pentaethylenehexamine, etc.

Here again, it is understood that one or both of the groups containing two carbon atoms may be replaced by a group containing 3, 4, 5 or 6 carbon atoms.

As hereinbefore set forth, in a preferred embodiment the alkyl groups attached to the terminal nitrogen atoms are secondary alkyl groups. In another embodiment, these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alkylated derivatives thereof. The cycloalkyl groups may be considered as corresponding to secondary alkyl groups. The secondary alkyl configuration is definitely preferred although, when desired, the alkyl groups attached to the terminal nitrogen atoms may be normal alkyl groups but not necessarily with equivalent results.

The polyalkyl-polyhydroxyalkyl-alkylenepolyamines for use in preparing the borate may be obtained from any suitable source or prepared in any suitable manner. Here again the parent application describes the preparation of these compounds and such preparations are embodied herein as part of the present specifications.

In another embodiment, an alcohol, including aliphatic or aromatic alcohol, or mercaptan, including aliphatic or aromatic mercaptan, is included in the reaction charge to satisfy one or two of the valences of the boron. When used, the alcohol or mercaptan generally is employed in an amount of from about 0.5 to about 2 mole proportions thereof per one mole proportion of the alkanolamine or polyalkylpolyhydroxyalkylalkylenepolyamine. Preferred aliphatic alcohols include methanol, ethanol, isopropanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, etc. Preferred aromatic alcohols include phenol, cresol, xylenol, catechol, alkyl catechol, etc., or these having alkoxy or halo substituents. Preferred mercaptan include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

The borate for use in the present invention is prepared in any suitable manner and generally by reacting the alkanolamine or polyalkylpolyhydroxyalkyl-alkylenepolyamine with a suitable borating agent in the presence of a solvent at a temperature of from about 60° to about 100° C. or up to about 200° C. Here again, the details of the reaction and the discussion of the borylating agents are disclosed in the parent applications and embodied herein as part of the present specifications.

The exact structure of the borated product will vary with the particular alkanolamine and borylating agent employed, as well as with the proportions of the reactants and, when used, the extraneous alcohol or mercaptan. For example, when reacting three mol proportions of N,N-dicyclohexyl-ethanolamine with one mole proportion of boric acid, it is believed that the triester is formed in which all valences of the boron are satisfied by the N,N-dicyclohexyl-aminoethoxy radical formed by the liberation of water. When equal mole proportions of N,N-di-cyclohexyl-ethanolamine and boric acid are reacted at a higher temperature, the meta-borate is formed. When the reaction is effected using an extraneous alcohol or mercaptan in addition to the alkanolamine, the resulting borate will be a mixed borate in which one or two of the valences of the boron are satisfied by the alkanolamine and the remaining valence or valences of the boron are satisfied by the alcohol, mercaptan, phenol or catechol derivative. When employing a trialkyl borate as the borylating agent, either complete or partial transesterification occurs depending upon the proportions of reactants and conditions of operation.

Similarly, when the polyalkyl-polyhydroxyalkyl-alkylene-polyamine is a polyalkyl-polyhydroxyalkyl-ethylenediamine, probable compounds may include one or more of the following as monomer or as recurring units: (1)

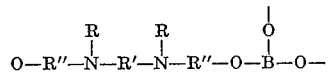

(2) a cyclic configuration in which each of the oxygens of the hydroxyl group are attached to a boron atom and the third valence is otherwise satisfied, (3) a polycyclic structure similar to that described in (2) joined by the —B—O—B— linkage, (4) compound in which each of the hydrogens of the hydroxyl groups are replaced with a

(5) compounds having boroxine configuration and (6) metaborates.

From the above discussion, it will be seen that the exact structure of the borate may vary and also that the product may consist of a mixture of compounds. Accordingly, this component of the synergistic mixture of the present invention is being claimed generically by its method of manufacture. It is understood that the different borated compounds meeting the requirements as hereinbefore set forth may be used for the purposes of the present invention, but that these different compounds are not necessary equivalent in their effectiveness in the same or different substrate.

The second component of the synergistic mixture of the present invention is a hydroxyphenone. The hydroxyphenone is of the following general formula:

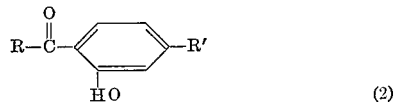

where R is selected from the group consisting of aryl, alkyl and cycloalkyl and R' is selected from the group consisting of hydrogen, alkyl, cycloalkyl, hydroxy, alkoxy, aryloxy and cycloalkoxy.

Where R is aryl, the hydroxyphenone is a hydroxybenzophenone. It is understood that the hydroxybenzophenone may contain one or a plurality of hydroxy groups and, in fact, a particularly preferred hydroxybenzophenone is 2,2' - dihydroxybenzophenone. Other hydroxybenzophenones include 2-hydroxybenzophenone, 2,3-dihydroxybenzophenone, 2,5-dihydroxybenzophenone, 2,6-dihydroxybenzophnone, 2,3,5 - trihydroxybenzophenone, 2,3,5,6 - tetrahydroxybenzophenone, 2,2',3,3' - tetrahydroxybenzophenone, 2,2',4,4'-tetrahydroxybenzophenone, 2,2',5,5' - tetrahydroxybenzophenone and 2,2',6,6'-tetrahydroxybenzophenone.

Where R in the above formula is aryl and R' is a substituent selected from those hereinbefore set forth, illustrative but not limiting examples of hydroxybenzophenones include 2 - hydroxy - 4 - alkylbenzophenone in which the alkyl contains from one to 30 carbon atoms and preferably from one to 18 carbon atoms and thus is selected from methyl, ethyl, propyl, butyl, pentyl, hexyl, heptyl, octyl, nonyl, decyl, undecyl, dodecyl, etc., 2-hydroxy-4-cycloalkylbenzophenone in which the cycloalkyl contains from 3 to 12 carbon atoms in the cycloalkyl ring and preferably is cyclohexyl but may be cyclopropyl, cyclobutyl, cyclopentyl, cycloheptyl, cyclooctyl, cyclononyl, cyclodecyl, cycloundecyl or cyclododecyl, 2-hydroxy-4-alkoxybenzophenone in which the alkoxy group contains from 1 to 30 carbon atoms and preferably from 3 to 20 carbon atoms and thus is selected from propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy and eicosoxy, 2-hydroxy-4-aryloxybenzophenone in which the aryloxy group is selected from phenoxy, toluoxy, xyloxy, etc., 2-hydroxy-4-cycloalkoxybenzophenone in which the cycloalkyl ring contains from 3 to 12 carbon atoms and is selected from cyclopropoxy, cyclobutoxy, cyclopentoxy, cyclohexoxy, cycloheptoxy, cyclooctoxy, cyclononoxy, cyclodecoxy, cycloundecoxy and cyclododecoxy, and similarly substituted compounds where two or more of the same or different groups selected from those set forth hereinbefore are attached to one or both of the phenyl rings.

Where the hydroxybenzophenone contains a hydroxy group on each of the phenyl rings, the hydroxy groups preferably are in the positions of 2,2'- and accordingly a preferred hydroxybenzophenone for use in forming the borate is 2,2'-dihydroxybenzophenone. Illustrative but not limiting compounds in this embodiment of the invention include 2,2'-dihydroxy-4-alkylbenzophenone,
2,2'-dihydroxy-4,4'-dialkylbenzophenone,
2,2'-dihydroxy-4-cycloalkylbenzophenone,
2,2'-dihydroxy-4,4'-dicycloalkylbenzophenone,
2,2'-dihydroxy-4-alkoxybenzophenone,
2,2'-dihydroxy-4,4'-dialkoxybenzophenone,
2,2'-dihydroxy-4-aryloxybenzophenone,
2,2' dihydroxy-4,4'-diaryloxybenzophenone,
2,2'-dihydroxy-4-cycloalkoxybenzophenone and
2,2'-dihydroxy-4,4'-dicycloalkoxybenzophenone, in which these substituents are selected from these specifically hereinbefore set forth. Here again, it is understood that one or both of the phenyl rings may contain two or more of the same or different substituents selected from those set forth above.

Where R in the above formula is alkyl, illustrative hydroxybenzophenones include 2 - hydroxyacetophenone, 2-hydroxypropiophenone, 2-hydroxybutyrophenone, 2-hydroxyvalerophenone, 2 - hydroxycaprylophenone, 2 - hydroxylaurylphenone, 2 - hydroxypalmitylphenone, etc. Here again it is understood that the phenyl ring may contain one or more of the substituents hereinbefore set forth and also that the alkyl moiety may contain one or more substituents attached thereto, these substituents preferably being selected from those hereinbefore specifically set forth. Where R in the above formula is cycloalkyl, the cycloalkyl preferably is cyclohexyl or it may be cyclopropyl, cyclobutyl, cyclopentyl, cycloheptyl, cyclooctyl, cyclononyl, cyclodecyl, cycloundecyl, cyclodedecyl, etc. Here again the cycloalkyl ring may contain one or more of the substituents hereinbefore set forth.

From the above description, it will be seen that various hydroxyphenones may be used in the antioxidant mixture of the present invention. The hydroxyphenones generally are available in the open market or may be prepared by conventional means. It is understood that the different hydroxyphenones are not necessarily equivalent in their effectiveness in the mixture of the present invention.

As hereinbefore set forth, the antioxidant mixture of the present invention also may contain a trialkylphenol. A particularly preferred trialkylphenol is 2,6-di-tertiary-butyl-4-methylphenol. Other trialkylphenols include 2,6-di-isopropyl-4-methylphenol,
2,6-diamyl-4-methylphenol,
2,6-dihexyl-4-methylphenol,
2,6-diheptyl-4-methylphenol,
2,6-dioctyl-4-methylphenol,
2,6-dinonyl-4-methylphenol,
2,6-didecyl-4-methylphenol,
2,6-didodecyl-4-alkylphenol,
2,6-ditridecyl-4-alkylphenol,
2,6-ditetradecyl-4-alkylphenol,
2,6-dipentadecyl-4-alkylphenol,
2,6-dihexadecyl-4-alkylphenol,
2,6-diheptadecyl-4-alkylphenol,
2,6-dioctadecyl-4-alkylphenol, etc.,
2,4-dimethyl-6-isopropylphenol,
2,4-dimethyl-6-tertiary-butylphenol,
2,4-dimethyl-6-pentylphenol,
2,4-dimethyl-6-hexylphenol,
2,4-dimethyl-6-heptylphenol,
2,4-dimethyl-6-octylphenol,
2,4-dimethyl-6-nonylphenol,
2,4-dimethyl-6-decylphenol, etc.,
2,6-diethyl-4-alkylphenol,
2,6-dipropyl-4-alkylphenol,
2,6-dibutyl-4-alkylphenol,
2,6-diamyl-4-alkylphenol,
2,6-dihexyl-4-alkylphenol, etc., in which the alkyl contains from 1 to 20 or more carbon atoms. In one embodiment, the trialkylphenol will contain one or two alkyl groups containing four or less carbon atoms and one or two alkyl groups containing four or more carbon atoms, the latter preferably being of tertiary configuration. These trialkylphenols may be obtained in the open market or prepared in any suitable manner. Here again, it is understood that the different trialkylphenols are not necessarily equivalent in their use in the antioxidant mixture of the present invention.

The synergistic mixture will comprise from about 10% to about 90% by weight of the borate of the alkanolamine or polyalkylpolyhydroxyalkyl alkylene polyamine and from about 10% to about 90% by weight of the hydroxyphenone. In a particularly preferred embodiment the borate will comprise from about 50% to about 90% by weight and the hydroxyphenone will comprise from about 10% to about 50% by weight of the mixture. When employed, the trialkylphenol will be used in a concentration of from about 0.1% to about 10% by weight of the antioxidant mixture.

The antioxidant mixture will be used in an antioxidant concentration in the organic substrate to be stabilized. In general, this may range from about 0.001% to 10% and more particularly from about 0.01% to about 2% by weight of the substrate.

As hereinbefore set forth, the synergistic mixture of the present invention is used as an antioxidant in any organic substrate which normally undergoes oxidative deterioration. In one embodiment, the organic substrate is plastic. Illustrative plastics include polyolefins and particularly polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc.

Another plastic being used commercially on a large scale is polystyrene. The polystyrenes are particularly useful in the manufacture of molded or machined articles which find application in such goods as windows, optical goods, automobile panels, molded household articles, etc.

Another class of plastics available commercially is broadly classed as vinyl resins and is derived from monomers such as vinyl chloride, vinyl acetate, vinylidine chloride, etc. Polyvinyl chloride plastics are available commercially on a large scale. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon," and ABS resins (acrylonitrile-butadiene-styrene copolymer). Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyester, etc., polyurethane resins, various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing, foams or other shapes.

Another organic substrate which undergoes deterioration due to oxidation is rubber. Rubber is composed of polymers of conjugated 1,3-dienes, either as polymers thereof or as copolymers thereof with other polymerizable compounds, and may be synthetically prepared or of natural origin. Synthetic rubbers include SBR rubber (copolymer of butadiene and styrene), Buna A (copolymer of butadiene and acrylontrile), butyl rubber (copolymer of butadiene and isobutylene), neoprene rubber (chloroprene polymer), Thiokol rubber (polysulfide), silicone rubber, EPR-rubber (ethylene-propylene-diene rubber), etc. Natural rubbers include hevea rubber, caoutchouc, balata, gutta percha, etc.

Still other organic substrates which undergo deterioration due to oxidation include paints, varnishes, drying oils, pigments, rust preventative coatings, other protective coatings, etc.

Still other organic substrates which under oxidative deterioration comprise hydrocarbon oils including gasoline, naphtha, kerosene, solvents, fuel oil, diesel oil, lubricating oil, etc. The lubricating oil may be of natural origin and includes mineral oils generally referred to as motor lubricating oil, railroad type lubricating oil, marine oil, transformer oil, turbine oil, differential oil, diesel lubricating oil, gear oil, cylinder oil, specialty products oil, cutting oil, rolling oil, drawing oil, soluble oil, etc. Other natural oils include those of animal, marine or vegetable origin.

The lubricating oil may be synthetic and of varied types including aliphatic esters, polyalkylene oxides, silicones, esters of phosphoric and silicic acids, highly fluorine-substituted hydrocarbons, etc. of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters includes dihexyl azelate, di-(2-ethylhexyl) azelate, di-3,5,5-trimethylhexyl glutarate, di-3,5,5-trimethylpentyl glutarate, di(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisoproyplene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to twelve centistokes or higher, and (4) tricresylphosphate, trioctylphosphate, trinonylphosphate, tridecylphosphate, as well as mixed aryl and alkyl phosphates, etc.

The present invention also is used in greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

While the antioxidant mixture of the present invention is very effective, advantages may appear to use the same in admixture with other additives and such use will depend upon the particular substrate being stabilized. For example, in lubricating oil the additional additives may comprise one or more of viscosity index improver, pour point depressant, detergent, corrosion inhibitor, additional antioxidant, etc. Such additional additives may be one or more of 2-tertiary-butyl-4-methoxyphenol, 2-tertiary-butyl-4-ethoxyphenol, 3,3'5,5'-tetratertiary-butyl-diphenylmethane, etc. In plastics, other additives include phenyl-alpha-naphthylamine, phenyl-beta-naphthylamine, phenothiazine, dialkylated phenols, 2,2'-methylene-bis-(4-methyl-6-tertiary-butylphenol), 2,2' - methylene - bis - (4-ethyl-6-tertiary-butylphenol, diphenyl-p-phenylenediamine, 4,4'-thio-bis-(6-tert-butyl-o-cresol), 2,6-bis-(2'-hydroxy-3'-tert-butyl-5'-methyl-benzyl)-4-methylphenol, p-octylphenyl salicylate, nickel-bis-dithio-carbamate, dilaurylbeta-mercapto-dithiopropionate. Such additional inhibitors may be used in a concentration of from 1% to about 25% by weight each of the antioxidant mixture of the present invention.

The components of the antioxidant mixture of the present invention may be added separately to the organic substrate to be stabilized, preferably with intimate mixing in order to obtain uniform distribution throughout the substrate. Preferably, the synergistic mixture is first formed by commingling the components with or without other additives, and then adding the mixture to the substrate to be stabilized. When desired, the mixture or the individual components may be utilized as such or prepared as a solution in a suitable solvent.

The following examples are introduced to illustrate further the novelty and utility of the present invention but not with the intention of unduly limiting the same.

Example I

The borate of N,N-dicyclohexyl-ethanolamine was prepared by the reaction of 3 mole proportions of N,N-dicyclohexyl-ethanolamine with 1 mole proportion of boric acid. Specifically, 68.4 g. (0.3 mole) of N,N-di-cyclohexyl-ethanolamine and 6.18 g. (0.1 mole) of boric acid were refluxed in the presence of 100 g. of benzene at a temperature of about 85° C. The heating and refluxing was continued until a total of 5 cc. of water was collected. Following completion of the reaction, the benzene was removed by vacuum distillation at a temperature of about 170° C. at 0.4 mm. Hg. The product was recovered as a liquid having a basic nitrogen content of 4.29 meq./g., an acid value of 0.008 meq./g. and a boron content of 1.42% by weight. This corresponds to the theoretical boron content of 1.58% by weight for the compound tris-(N,N-di-cyclohexyl-ethoxy) borate having the formula:

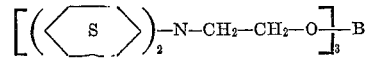

A synergistic antioxidant mixture is prepared by commingling 100 pounds of the borate prepared in the above manner with 50 pounds of 2-hydroxy-4'-octoxy-benzophenone, the latter being available commercially as Cyanosorb 531.

Example II

Another synergistic antioxidant mixture is prepared by commingling 15 pounds of 2,6-di-tertiary-butyl-4-methylphenol with the mixture prepared in accordance with Example I.

Example III

Another synergistic antioxidant mixture is prepared by commingling 100 pounds of the borate of N,N-dicyclohexyl-ethanolamine prepared as described in Example I with 50 pounds of 2,2'-dihydroxy-4-octoxy-benzophenone, the latter being available commercially as Stabilizer #314.

Example IV

Another antioxidant mixture is prepared by commingling 15 pounds of 2,6-di-tertiary-butyl-4-methylphenol with the mixture prepared as described in Example III.

Example V

The borate of N,N-dicyclohexyl-ethanolamine also was prepared by the reaction of N,N-di-cyclohexyl-ethanolamine and nonyl boronic acid. Specifically, 22.5 g. (0.1 mole) of N,N-di-cyclohexyl-ethanolamine and 8.59 g. (0.05 mole) of nonyl boronic acid were heated and refluxed in the presence of 50 g. of benzene. A total of 1.4 cc. of water was collected. The product was vacuum distilled at a temperature of 115° C. and 18 mm. Hg. The product is believed to be the N,N-di-cyclohexyl-aminoethyl diester of nonyl boronic acid. 1.71% by weight of boron was found on analysis.

A synergistic mixture is prepared by commingling 50 pounds of the borate prepared in the above manner with 20 pounds of 2-hydroxycaprylophenone.

Example VI

The borate of N,N-di-sec-octyl-ethanolamine was prepared by heating and refluxing 33.7 g. (0.118 mole) of N,N - di - (1-methylheptyl)-ethanolamine and 2.43 g. (0.039 mole) of boric acid in 100 g. of benzene at a temperature of about 85° C. Following completion of the reaction and removal of the benzene by vacuum distillation at 145° C. and 18 mm. Hg, the product was recovered as a liquid having a boron content of 1.30% by weight. This corresponds to a theoretical boron content of 1.25% by weight for the triester of the reaction of 3 mole proportions of the N,N-di-sec-octyl-ethanolamine with 1 mole of boric acid and may be illustrated by the formula:

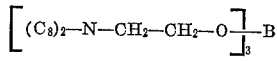

A synergistic antioxidant mixture is prepared by commingling 100 pounds of the borate prepared in the above manner with 60 pounds of 2-hydroxyacetophenone and 20 pounds of 2,4-dimethyl-6-tertiary-butylphenol.

Example VII

The borate of this example is prepared by heating and refluxing a mixture of 1 mole proportion of boric acid, 2 mole proportions of N,N-di-cyclohexyl-propanolamine and 1 mole proportion of 2,6-ditertiarybutyl-4-methylphenol in the presence of benzene solvent. The heating and refluxing is continued until the desired amount of water is collected, after which the reaction mixture is subjected to distillation under vacuum to remove the benzene solvent and to recover the liquid product.

A synergistic antioxidant mixture is prepared by commingling 100 pounds of the borate prepared as described above with 40 pounds of resacetophenone.

Example VIII

The borate of this example was prepared by reacting 1 mole proportion of boric acid with 1 mole proportion of N,N'-di-sec-octyl-N,N' - di - (2-hydroxyethyl)-ethylenediamine and 1 mole proportion of isodecyl alcohol. The N,N'-di-sec-octyl - N,N' - di-(2-hydroxyethyl)-ethylenediamine was prepared by reacting N,N'-bis-(1-methylheptyl)-ethylenediamine with 2 mole proportions of ethylene oxide. The oxyethylenation was effected by intimately mixing the reactants in a turbomixer at a temperature of about 115° C. and a pressure of about 250 p.s.i. for about two hours. The product was recovered as a liquid boiling at 188° C. at 0.4 mm. Hg and having an index of refraction $n_D^{20}$ of 1.4705, basic nitrogen content of 5.37 meq./g., hydroxyl content of 4.5 meq./g. and a G.L.C. purity of 98%.

The borylation was effected by heating and refluxing a mixture of 107.5 g. (0.25 mole) of the N,N'-di-sec-octyl-N,N'-di-(2-hydroxyethyl)-ethylenediamine, 39.5 g. (0.25 mole) of isodecyl alcohol, 15.45 g. (0.25 mole) of boric acid and 200 g. of benzene solvent. A total of 13.5 cc. of water was collected. The benzene solvent was removed by distilling at 175° C. under a vacuum of 18 mm. Hg. The product was recovered as a liquid having a basic nitrogen of 3.86 meq./g. and a percent boron of 1.85% by weight.

A synergistic antioxidant mixture is prepared by commingling 100 pounds of the borate prepared in the above manner with 50 pounds of 2-hydroxy-4'-octoxybenzophenone.

Example IX

Another synergistic antioxidant mixture is prepared by commingling 15 pounds of 2,6-di-tertiary-butyl-4-methylphenol with the mixture prepared in accordance with Example VIII.

Example X

The borate of this example is prepared by the reaction of equal mole proportions of $N^1,N^3$-di-sec-octyl-$N^1,N^2$, $N^3$ - tri - (2-hydroxyethyl)-diethylenetriamine and boric acid. The $N^1,N^3$-di-sec-octyl - $N^1,N^2,N^3$ - tri-(2-hydroxyethyl)-diethylenetriamine is prepared by reacting 1 mole proportion of $N^1,N^3$-bis-(1-ethyl - 3 - methylpentyl)-diethylenetriamine with 3 mole proportions of ethylene oxide in a turbomixer at a temperature of about 100° C. for about 4 hours. $N^1,N^3$-di-sec-octyl-$N^1,N^2,N^3$-tri-(2-hydroxyethyl)-diethylenetriamine is recovered as a light colored liquid having a boiling point of 233–235° C. at 0.5 mm. Hg, a basic nitrogen content of 6.58 meq./g. and a hydroxyl content by acetylation method of 5.75 meq./g.

The reaction of the $N^1,N^3$-di-sec-octyl-$N^1,N^2,N^3$-tri-(2-hydroxyethyl)-diethylenetriamine and boric acid is effected by heating and refluxing the mixture in the presence of benzene solvent until the theoretical amount of water is collected. Following completion of the reaction, the reaction product is distilled under vacuum to remove benzene solvent and to recover the borylated product as a liquid.

A synergistic antioxidant mixture is prepared by commingling 50 pounds of the borate prepared in the above manner with 50 pounds of 2,2'-dihydroxy-4-octoxy-benzophenone.

Example XI

Another synergistic antioxidant mixture is prepared by commingling 10 pounds of 2,6-di-tertiary-butyl-4-methylphenol with the mixture prepared in accordance with Example X.

Example XII

The borate of this example is prepared by the reaction of equal mole proportions of N,N'-dicyclohexyl-N,N'-di-(2-hydroxyethyl)-ethylenediamine and boric acid. The reaction is effected under refluxing conditions at a temperature of about 130° C. in the presence of xylene solvent.

A synergistic antioxidant mixture is prepared by commingling 100 pounds of the borate prepared as described above with 40 pounds of 2-hydroxy-acetophenone and 10 pounds of 2,4-dimethyl-6-tertiary-butylphenol.

Example XIII

As hereinbefore set forth the mixture of the present invention is of high antioxidant potency due to a synergistic effect between the components. This is demonstrated in a series of evaluations made in a solid polypropylene. The solid polypropylene without additive is stated to have properties substantially as follows.

TABLE I

| | |
|---|---|
| Specific gravity | 0.910–0.920 |
| Refractive index, $n_D^{25}$ | 1.510 |
| Heat distortion temperature: | |
| At 66 p.s.i. load °C | 116 |
| At 264 p.s.i. load °C | 66 |
| Tensile yield strength, p.s.i. (ASTM D-638-58T) (0.2″ per min.) | 4700 |
| Total elongation, percent | 300–400 |
| Stiffness flexural (ASTM D747-50) $10^5$ p.s.i. | 1.8 |
| Shore hardness (ASTM D676-55T) | 74D |

The different additive mixtures were incorporated into the samples of the polypropylene by milling. The samples of the polypropylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, the control sample of the polypropylene without additive had an Induction Period of 4¼ hours.

Another sample of the polypropylene containing 1% by weight of the borate of N,N-dicyclohexyl-ethanolamine, prepared as described in Example I, 0.5% by weight of 2-hydroxy-4'-octoxy-benzophenone and 0.15% by weight of 2,6-di-tertiary-butyl-4-methylphenol was evaluated in the same manner and the Induction Period was increased to about 1767 hours.

In order to demonstrate the synergistic effect, another sample of the polypropylene was prepared to contain 1% by weight of 2-hydroxy-4-octoxyphenone and 0.5% by weight of 2,6-di-tertiary-butyl-4-methylphenol. This sample of polypropylene, when evaluated in the same manner, had an Induction Period of less than 22 hours.

As hereinbefore set forth, the borate of N,N-di-cyclohexyl-ethanolamine is very effective as a weathering stabilizer against UV absorption. However, it is not exceptional as purely an antioxidant. This is demonstrated by another sample of the polypropylene containing 1% by weight of the borate of N,N-dicyclohexyl-ethanolamine and 0.15% by weight of 2,6-di-tertiary-butyl-4-methylphenol, which sample had an Induction Period of less than 133 hours when evaluated in the same manner as described above.

The above data demonstrate the synergistic effect obtained by using the mixture of the present invention as compared to the use of either of the components separately. The 2,6-di-tertiary-butyl-4-methylphenol when used alone and evaluated in the above manner was of substantially no effect in increasing the Induction Period of the polypropylene.

Example XIV

A similar series of evaluations was made in the manner as described in Example XIII except the synergistic mixture in this example comprised 1% by weight of the borate of N,N-dicyclohexyl-ethanolamine, 0.5% by weight of 2,2'-dihydroxy-4-octoxy-benzophenone and 0.15% by weight of 2,6-di-tertiary-butyl-4-methylphenol.

The above mixture was incorporated in another sample of the polypropylene and evaluated in the same manner as described in Example XIII. This sample of the polypropylene had an Induction Period of about 1960 hours. This again demonstrates the unusual antioxidant properties of the synergistic mixture of the present invention.

Example XV

The synergistic mixture prepared as described in Example IX is incorporated in a concentration of 1.5% of total additive in solid polyethylene of the high density type. An inhibited product of this polyethylene is marketed commercially under the trade name of "Fortiflex." The synergistic mixture is incorporated in the polyethylene during milling thereof and serves to decrease deterioration of the polyethylene due to oxidation.

Example XVI

The synergistic mixture prepared as described in Example II is used in a concentration of 1% by weight in polystyrene. The synergistic mixture is incorporated in the polystyrene during milling thereof and this serves to inhibit deterioration of polystyrene due to oxidation reactions.

Example XVII

The synergistic mixture prepared as described in Example II is used in a concentration of 1% by weight in ABS resin. Oven aging at 140° C. does not cause discoloration due to oxidation.

Example XVIII

This example describes the use of the antioxidant mixture of the present invention in synthetic lubricating oil. The synthetic lubricating oil is dioctyl-sebacate and is marketed under the trade name of "Plexol." The antioxidant mixture of this example comprises 60% by weight with borate of N,N-dicyclohexyl-propanolamine and 40% by weight of 2-hydroxy-laurylphenone. The antioxidant mixture is incorporated in a concentration of 1% by weight in the synthetic lubricating oil with intimate mixing.

Example XIX

This example describes the use of the antioxidant mixture of the present invention in grease. In this example, a synergistic mixture comprises 75% by weight of borate of N,N-di-sec-octyl-ethanolamine, prepared as described in Example VI, and 25% by weight of 2-hydroxy-acetophenone. This mixture is incorporated in a concentration of 0.3% by weight in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently, the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.3% by weight of the mixture of the present invention will not reach the Induction Period until more than 100 hours when evaluated in the above manner.

I claim as my invention:
1. Synergistic antioxidant mixture of about 10% to about 90% by weight of a boron ester of an alkanolamine and about 10% to about 90% by weight of a hydroxyphenone, said alkanolamine having the formula

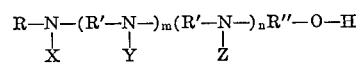

where R and Z are hydrocarbyl independently selected from the group consisting of sec-alkyl containing up to about 50 carbon atoms and cycloalkyl containing up to about 12 carbon atoms; R' is alkylene containing from 2 to about 6 carbon atoms; R" is alkylene containing from 2 to about 8 carbon atoms; X is hydrocarbyl as above defined when $m$ and $n$ are zero or hydroxyalkyl when $m$ is one or more and $n$ is zero or one; Y is hydrocarbyl as above defined when $m$ is one and $n$ is zero or hydroxyalkyl when $m$ is more than one and $n$ is one; $m$ is an integer of zero to 4; and $n$ is zero or one; and said hydroxyphenone having the formula

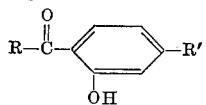

where R is selected from the group consisting of phenyl, hydroxyphenyl, alkoxyphenyl containing from 1 to 30 carbon atoms in the alkoxy, alkyl of from 1 to about 16 carbon atoms, cycloalkyl containing from 3 to 12 carbon atoms in the ring, and R' is selected from the group consisting of hydrogen, alkyl of from 1 to about 18 carbon atoms, cycloalkyl containing from 3 to 12 carbon atoms in the ring, hydroxy, alkoxy of from 1 to about 30 carbon atoms, phenoxy and cycloalkoxy containing from 3 to 12 carbon atoms in the ring.

2. The mixture of claim 1 wherein said alkanolamine is N,N-dicycloalkyl-alkanolamine containing from 3 to 12 carbon atoms in each cycloalkyl and 2 to 8 carbon atoms in the alkanol moiety.

3. The mixture of claim 1 wherein said alkanolamine is N,N'-di-sec-alkyl-N,N'-dihydroxyalkyl-alkylene-diamine in which each sec-alkyl contains from 3 to 50 carbon atoms and the alkylene contains from 2 to 8 carbon atoms.

4. An organic substrate normally subject to oxidative deterioration containing a minor but stabilizing amount of the synergistic mixture of claim 1.

5. The mixture of claim 1 wherein said alkanolamine is N,N-dicyclohexyl-ethanolamine and said hydroxyphenone is 2-hydroxy-4'-octoxy-benzophenone or 2,2'-di-hydroxy-4-octoxy-benzophenone.

6. The mixture of claim 1 wherein said alkanolamine is N,N-di-sec-alkyl-alkanolamine containing from 3 to 50 carbon atoms in each alkyl and 2 to 8 carbon atoms in the alkanol moiety.

7. The mixture of claim 1 wherein said hydroxyphenone is a hydroxybenzophenone.

8. The mixture of claim 1 also containing about 0.1 to about 10% by weight of the mixture of trialkylphenol.

9. The mixture of claim 2 wherein said alkanolamine is N,N-dicyclohexyl-alkanolamine.

10. The mixture of claim 6 wherein said alkanolamine is N,N-di-sec-octyl-ethanolamine.

11. The mixture of claim 3 wherein said alkylenediamine is N,N'-di-sec-octyl-N,N'-di-(2-hydroxyethyl)-ethylenediamine.

12. The mixture of claim 7 wherein said hydroxyphenone is 2-hydroxy-4'-octoxy-benzophenone.

13. The mixture of claim 7 wherein said hydroxyphenone is 2,2'-di-hydroxy-4-octoxy-benzophenone.

14. The mixture of claim 8 wherein said trialkylphenol is 2,6-di-tertiary-butyl-4-methylphenol.

15. The composition of claim 4 wherein said organic substrate is a solid polymer.

16. The composition of claim 4 wherein said organic substrate is a hydrocarbon oil.

17. The composition of claim 16 wherein said organic substrate is lubricating oil.

18. The composition of claim 4 wherein said organic substrate is rubber.

19. The composition of claim 4 wherein said organic substrate is grease.

References Cited

UNITED STATES PATENTS

| | | | |
|---|---|---|---|
| 2,225,533 | 12/1940 | Dewey | 252—52 XR |
| 2,418,358 | 4/1947 | Lincoln et al. | 252—49.6 XR |
| 3,282,842 | 11/1966 | Bonner et al. | 252—52 XR |
| 3,301,888 | 1/1967 | Cyba | 260—462 |
| 3,011,992 | 12/1961 | Anderson | 260—45.9 XR |
| 3,030,406 | 4/1962 | Washburn et al. | 252—49.6 XR |
| 3,114,713 | 12/1963 | Coffield | 252—48.2 |

DANIEL E. WYMAN, *Primary Examiner.*

W. H. CANNON, *Assistant Examiner.*

U.S. Cl. X.R.

252—52, 400; 260—45.95, 45.9